US009235661B2

(12) United States Patent
Cai et al.

(10) Patent No.: US 9,235,661 B2
(45) Date of Patent: Jan. 12, 2016

(54) CONFIGURABLE BUSINESS RULES

(75) Inventors: Chris Cai, Shanghai (CN); Alex Cheng, Shanghai (CN); Derrick Traugott Oswald, Bern (CH); David Wilbur, Collinsville, IL (US)

(73) Assignee: Autodesk, Inc., San Rafael, CA (US)

( * ) Notice: Subject to any disclaimer, the term of this patent is extended or adjusted under 35 U.S.C. 154(b) by 1047 days.

(21) Appl. No.: 13/316,221

(22) Filed: Dec. 9, 2011

(65) Prior Publication Data

US 2013/0042193 A1 Feb. 14, 2013

(30) Foreign Application Priority Data

Aug. 11, 2011 (WO) ................ PCT/CN2011/078281

(51) Int. Cl.
*G06F 17/50* (2006.01)
(52) U.S. Cl.
CPC .......... *G06F 17/5004* (2013.01); *G06F 17/509* (2013.01); *G06F 2217/74* (2013.01); *G06F 2217/78* (2013.01)
(58) Field of Classification Search
CPC .... G06F 17/509; G06F 17/50; G06F 17/5027
See application file for complete search history.

(56) References Cited

U.S. PATENT DOCUMENTS

| 4,939,668 | A | * | 7/1990 | Brown | ................... | G06F 17/509 700/103 |
| 5,063,520 | A | * | 11/1991 | Klein | .................... | G06F 17/509 703/1 |
| 5,748,943 | A | * | 5/1998 | Kaepp | ................. | G06F 17/5095 700/104 |
| 7,761,859 | B2 | | 7/2010 | Low | | |
| 2004/0143428 | A1 | * | 7/2004 | Rappaport | ............ | G06F 17/509 703/22 |
| 2007/0229537 | A1 | | 10/2007 | Kohli et al. | | |
| 2008/0091387 | A1 | * | 4/2008 | Yamazaki | ............. | G06F 17/509 703/1 |

FOREIGN PATENT DOCUMENTS

| CN | 101025685 | 8/2007 |
| WO | 2009095034 | 8/2009 |

OTHER PUBLICATIONS

International Search Report and Written Opinion mailed May 17, 2012 from related International PCT Application No. PCT/CN2011/078281, 10 pages.

* cited by examiner

*Primary Examiner* — Alvin Tan
(74) *Attorney, Agent, or Firm* — Fish & Richardson P.C.

(57) ABSTRACT

Methods, systems, and apparatus, including computer programs encoded on a computer storage medium, for providing a graphical user interface configured to present a view of a computer model of a network, wherein the model of the network includes a plurality of elements that represent physical objects in the network and wherein each of the elements is associated with one or more rule points; receiving user input selecting a rule point for an element presented in the view; accepting user input specifying programming logic to be associated with a first one of the predefined conditions of the selected rule point, the programming logic having been entered into a graphical user interface configured to present an interactive template of the predefined condition; enabling the predefined condition based on the accepting; and validating the model by simulating operation of network.

33 Claims, 8 Drawing Sheets

CONFIGURABLE BUSINESS RULES

CROSS-REFERENCE TO RELATED APPLICATIONS

This application claims priority to PCT Application No. PCT/CN2011/078281, filed on Aug. 11, 2011, entitled "CONFIGURABLE BUSINESS RULES," the entirety of which is hereby incorporated by reference.

BACKGROUND

This specification relates to computer aided design tools.

Computer Aided Design (CAD) software tools are commonly used to plan, design, and analyze distribution networks. A CAD model can incorporate a physical model, e.g., representations of physical elements, such as capacitors, transformers, meters, risers, and the like that will be included in the utility network. Drawings prepared from such a model can be used in the actual physical construction of the corresponding utility network. The CAD model may be prepared and edited by various individuals, including utility engineers.

SUMMARY

In general, one aspect of the subject matter described in this specification can be embodied in a method that includes providing a graphical user interface that presents a view of a computer model of a network, wherein the model of the network includes a plurality of elements that represent physical objects in the network and wherein each of the elements is associated with one or more rule points; receiving user input selecting a rule point for an element presented in the graphical user interface, wherein the rule point comprises a plurality of predefined conditions which are disabled by default; accepting user input specifying programming logic to be associated with one of the predefined conditions of the selected rule point, the programming logic having been entered into a graphical user interface configured to present an interactive template of the predefined condition; enabling the predefined condition based on the accepting; and validating the model by simulating operation of network wherein validating includes executing user-specified programming logic associated with predefined conditions of one or more of the elements. Other embodiments of this aspect include corresponding systems, apparatus, and computer program products.

These and other embodiments can optionally include one or more of the following features. Validating the model by simulating operation of network includes generating an output associated with the elements. Generating an output includes identifying an error associated with an element and, in response to the identification, providing a graphical user interface configured to present a solution for correcting the identified error. Generating an output includes identifying a warning associated with an element and, in response to the identification, providing a graphical user interface configured to present a solution for correcting the identified warning. Generating an output includes identifying a suggestion associated with an element and, in response to the identification, providing a graphical user interface configured to present a solution for implementing the suggestion. Generating the output includes generating a material ordering list. Generating the output includes generating a numeric value, where the numeric value is accessible by a second rule point. Generating the output includes generating a textual value, where the textual value is accessible by a second rule point. The rule point is associated with a rule group in a plurality of rule groups, wherein the rule groups are processed according to a specified ordering as part of validating the model, and wherein the rule point is processed when the associated rule group is processed. Identification of an error in a rule group prevents processing of subsequent rule groups in the specified ordering. The rule point comprises one or more subrules that are shared with a least one other rule point, and where validating further comprises executing the subrules.

Particular embodiments of the invention can be implemented to realize one or more of the following advantages. Rule points embedded within compiled software can be used to customize operation of the software. Users can specify programmable logic (e.g., equations and formulas) for customizing the operations associated with rule points. Customized rule points can be used to validate proper operation of a network. Errors, including warnings or suggestions for improvements, associated with elements in a network can be identified. Solutions for correcting errors associated with elements in a network can be presented. Rule points can be grouped into a hierarchical arrangement of categories, where execution of rule points is controlled by execution of categories and providing a default operation associated with a category. Material ordering lists for elements in a network can be generated. Customized operations for rule points can be interchanged between different users and companies that are using the CAD software, and further, augmented or improved customized operations obtained externally can be easily incorporated. Upgraded software versions can add additional rule points without invalidating the custom operations associated with existing rule points.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Utility design products can incorporate domain specific formulas and rules that are needed to allow utility companies to plan, design, and analyze utility design models. For example, utility design models can include network component sizing, spatial placement, and material ordering. Generally, computations (e.g., programmable logic or equations) or parameters (e.g., variables, constants, values, and thresholds) used in distribution networks are hard-coded in software products, such that alteration of these parameters ordinarily requires modification of configuration files or databases. In such implementations, the hard-coding of computations or parameters can render it difficult to adapt the utility design product to different design scenarios and can also limit the extent of parameter modification.

For example, hard-coded computations may embody one particular method of calculation when other methods may be needed. In such implementations, the hard-coding of computations can make it difficult to adapt the software product to use alternative methods of computation. Moreover, parameters used in distribution networks can vary by utility company, customer, and project. Further to this example, depending on the scenario, such parameters may also need to be adapted to use different units, different environmental factors, different parameters based on country or region, tighter or looser tolerances, and different safety factors.

In various implementations, references to rule points can be embedded in CAD software source code. In particular, rule points can be associated with elements representing physical objects in a computer model of a network. Each rule point is associated with a set of one or more predefined conditions that can be modified by user-specified programming logic. As a result, interaction with elements in a computer model of a network can cause execution of rule points associated with those elements and, as a consequence, execute predefined conditions corresponding to those rule points. Users can modify rule points using programming logic to create or customize computations (e.g., formulas, equations, rules, or subrules) or parameters (e.g., variables, constants, values, or thresholds). Rule points can be created and edited by non-software engineers. Rule points, together with predefined conditions, can be processed by a rule engine to produce one or more results. A rule storage database can be used to store rule points.

Figure 1:
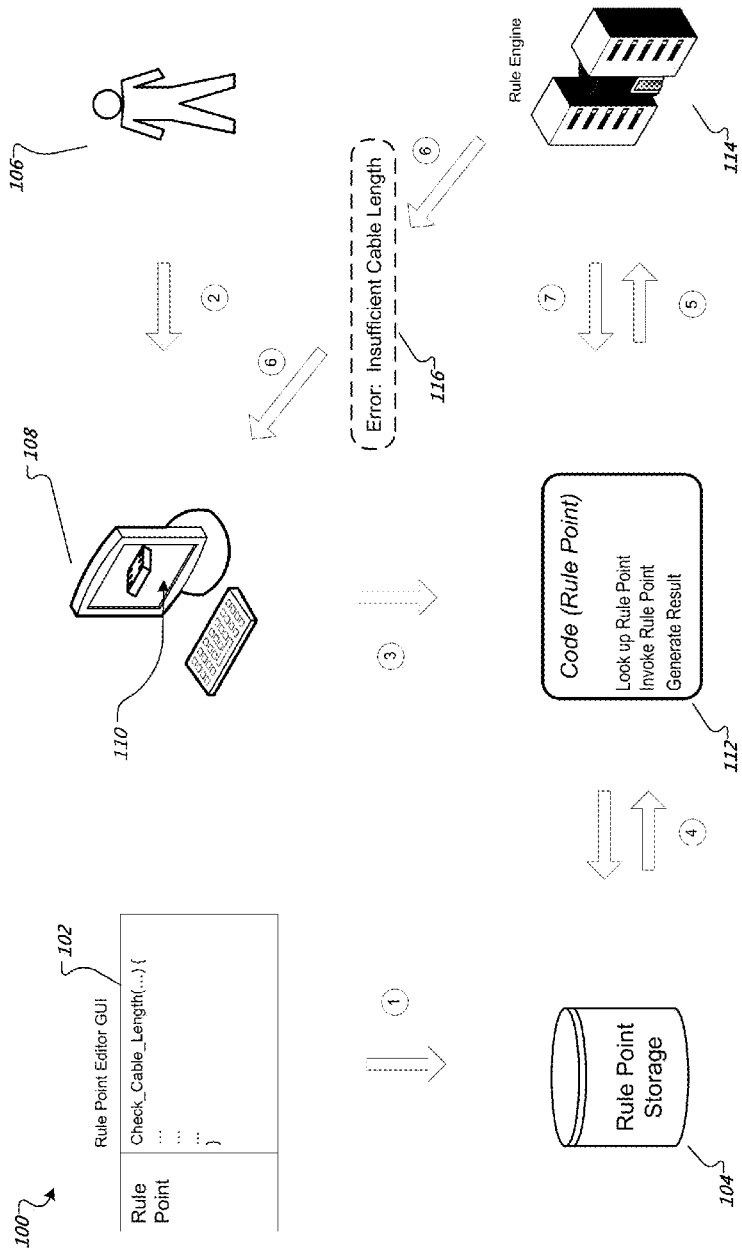
FIG. 1 is an illustration of an example system.

FIG. 1 shows an interactive view of an example system 100. In various implementations, rule points can be created and modified by users using a rule configuration graphical user interface 102. Rule points are stored in a rule storage database 104, during state (1). A user 106 uses a graphical user interface 108 that presents a view of a computer model of a utility network or other system to interact with an element 110 that represents a physical object in the network, during state (2). A rule point 112 associated with the element 110 is executed in response to the interaction, during state (3). In particular, a custom operation associated with the rule point 112 is obtained from the rule storage database 104, during state (4). The operation associated with the rule point 112 is evaluated by a rule engine 114, during state (5). In some implementations, the results obtained from evaluation of the rule by the rule engine 114 are used to identify design problems by displaying to the user 106 an error 116 along with a proposed resolution, during state (6). In some other implementations, the results obtained from evaluation of the rule by the rule engine 114 are used for further processing within the executing computer program, during state (7).

Figure 2:
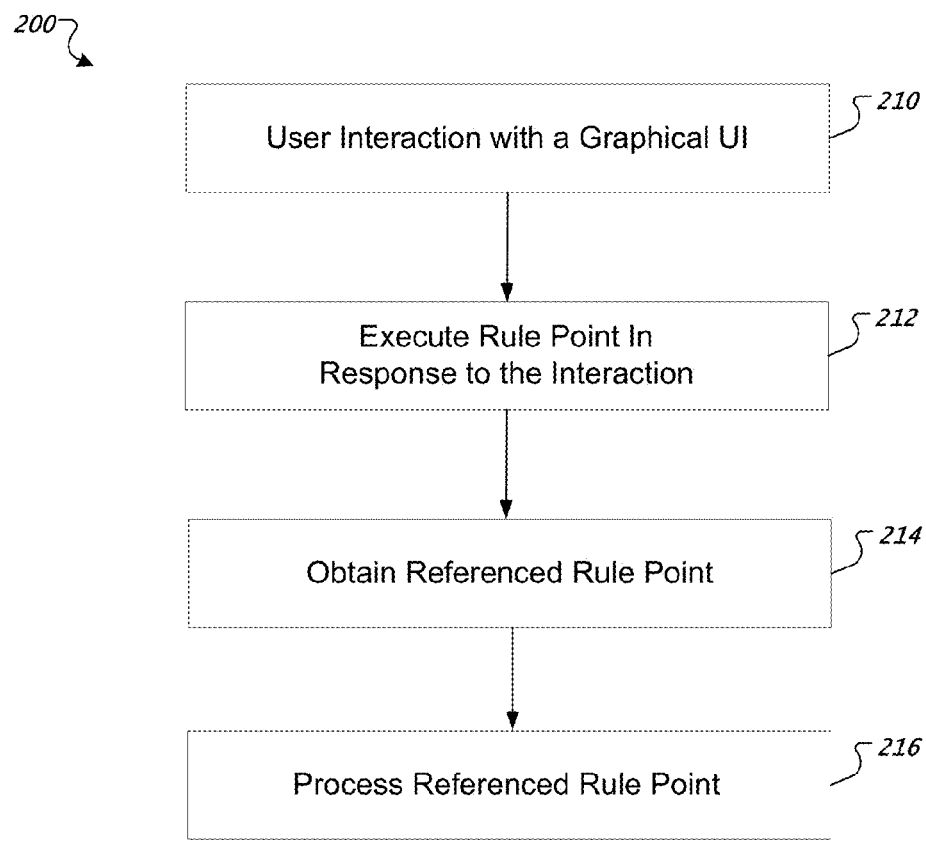
FIG. 2 is a flow chart illustrating an example technique for processing rule points.

FIG. 2 is a flow chart illustrating a technique for processing rule points. The process 200 can be performed by a computer system of one or more computers. A user interacts with an element presented on a graphical user interface (210). For example, a user can interact with a graphical user interface by creating an element (e.g., digitizing an electrical pole and transformer device) or by modifying an element (e.g., modifying a digitized transformer device to use a radial connection type). In various implementations, references to rule points can be embedded within CAD software, such that execution of the compiled software results in execution of the referenced rule points. In particular, software can be executed in response to the creation and/or modification of elements in a computer model of a network using a graphical user interface.

A rule point associated with the element is executed in response to the user interaction (212). For example, creating a transformer element on a graphical user interface can result in execution of an operation associated with a rule point that validates the properties selected for that transformer element. In another example, modifying a transformer element on a graphical user interface to connect a primary cable can result in execution of a second computer program that determines whether the connection between the transformer element and the primary cable is correct.

More specifically, source code for CAD software can include one or more references to rule points, where execution of the compiled software results in execution of the referenced rule point. For example, an "OrderLength" function can be included in software for adjusting the length of a cable connected to an element that is presented on a computer model of a network. Furthermore, a rule point reference can be included within the "OrderLength" function, such that execution of the "OrderLength" function can result in execution of the referenced rule point. The referenced rule point can be customized to perform one or more operations (e.g., increasing cable lengths at the ends of conductors to comply with company-specific standards for splicing and connection). In some alternative implementations, software plugins or libraries can be used to insert additional rule points within the CAD software.

Each rule point reference can include a rule label. A rule label can be a string capable of being parsed, e.g., a directory path, thereby allowing the rule referenced by the rule point to be arranged in a hierarchy. For example, a rule point can have a "Material/Ordering/Conductor" rule label, where "Material" is the top level category, where "Ordering" is the second level category, and where "Conductor" is the name of the rule referenced by the rule point. In some implementations, rule labels are localizable where rule points written in one language are automatically translated into another language when imported into the system. Rule points can also include a rule signature, which can specify input and output parameters associated with a rule referenced by the rule point.

One example program code for implementing a rule point is:

```
void OrderMaterial ( )
{
    // build material ordering context
    context = new MaterialOrderingContext (this);
    // loop over all features
    foreach (Feature feature in the_design)
    {
        // find applicable rule labels
        rule = LookupRule ("Material/Ordering/" +
        feature.FeatureClass.Name);
        // set context
        context.Feature = feature;
        // invoke the rule
        InvokeRule (rule, context);
    }
}
```

The example program code is executed in a Material Ordering context, where the program loops over all "features" (or elements) associated with a particular computer model of a network (e.g., "the_design"). The LookupRule call obtains the rule label associated with each "feature." In one example, the feature can be an "EL_BREAKER," where the rule label produced by the LookupRule call is "Material/Ordering/EL_BREAKER." Further to this example, a "context" (or rule signature) for the feature "EL_BREAKER" is set by the context.Feature assignment. The "context" can represent the input and output parameters for a given rule. In this example, the InvokeRule call executes the rule "Material/Ordering/EL_BREAKER" for each breaker element in the computer model of a network.

In some implementations, subrules can be used as subroutines within one or more rule points. Subrules can be used to localize formulas or logic that can be used by rule points. Similar to rule points, subrules can also include signatures that define input and output parameters. For example, input parameters can include references to an element, other elements that are connected to the element, or the computer model of a network. Output parameters can include, for example, Boolean values, strings, and integers.

In some implementations, a computer model of a network including one or more elements can be validated by executing user-specified programming logic associated with predefined conditions in a rule point. In particular, validation of the model can be performed by simulating operation of the network to ensure that elements included in the network are functioning properly. The validation process can involve analyzing each element in the network to determine, for example, whether the element is compatible with the network and whether the element contains the proper connections (e.g., ensuring that a transformer contains at least one primary cable). Rule points can be categorized in groups that correspond to the flow of design creation, such that execution of rule points can be performed in an ordering corresponding to a specified design flow. For example, rule points can be grouped into drafting, connectivity, validation, analysis, and material ordering categories. In some implementations, errors identified by rule points associated with a first category can prevent execution of rule points associated with subsequent categories in a specified design flow.

In particular, rule points can also be used to perform actions to produce a numeric or textual value (e.g., using equations or analysis). In some implementations, rule points can be used to perform analysis of elements in a computer model of a network (e.g., a rule point can perform electrical analysis in a computer model of a network using user-specified equations and variables). Rule points can also perform a series of specified actions that do not necessarily produce a value. In some implementations, rule points can be used to verify connectivity of elements in a computer model of a network, where the rule points are used to identify and report errors in a computer model of a network (e.g., a rule point can be configured to report an error if an electrical transformer does not have at least one primary conductor connection). In some other implementations, a rule point can be configured to provide one or more resolution actions in connection with a reported error. In yet some other implementations, rule points can be used to perform validation of elements in a computer model of a network (e.g., a rule point can be configured to determine if an electrical riser is needed based on a connected conductor type, and to generate an error which includes a resolution action for adding the required riser element). In some other implementations, rule points can be used to generate a material ordering listing (e.g., Bill of Materials) for elements included in a computer model of a network, where catalog items added to the material ordering listing can be customized (e.g., rule points can be customized to add a proper quantity of items for conductor elements based on the construction type and the length of the conductor).

The referenced rule point is obtained from a rule storage database (214). In some implementations, the rule points are stored in an eXtensible Markup Language (XML) format in National Character Large Object (NCLOB) fields. In some other implementations, the rule points can be exported as an eXtensible Application Markup Language (XAML) to allow customization of rule points for different applications, and to allow rule points created by third-party developers to be imported. In some alternative implementations, rule points stored in an XAML format contain an XML header and a byte order mark (BOM) to allow the rule points to support different encodings and character sets (e.g., allowing rule points to be localized to a particular country or region).

The referenced rule point is processed by a rules engine (216). In some implementations, the results of the rule evaluation can produce a value that can be used for further processing within an executing computer program (e.g., the results can be used by a program function embedded within the computer program). In some other implementations, the results of the rule evaluation can produce a value that can be used by a second rule point inserted within the computer program (e.g., by passing the results as a rule signature input for a rule referenced by the second rule point). In some alternative implementations, a user can be presented with specific messages, warnings, errors, resolution actions and/or workflows in response to identification of design problems. Users can respond to such visual cues by taking corrective actions. In some implementations, users can be presented with an error listing containing links or buttons for taking corrective actions. In some other implementations, corrective actions can be deferred or ignored.

Figure 3A:
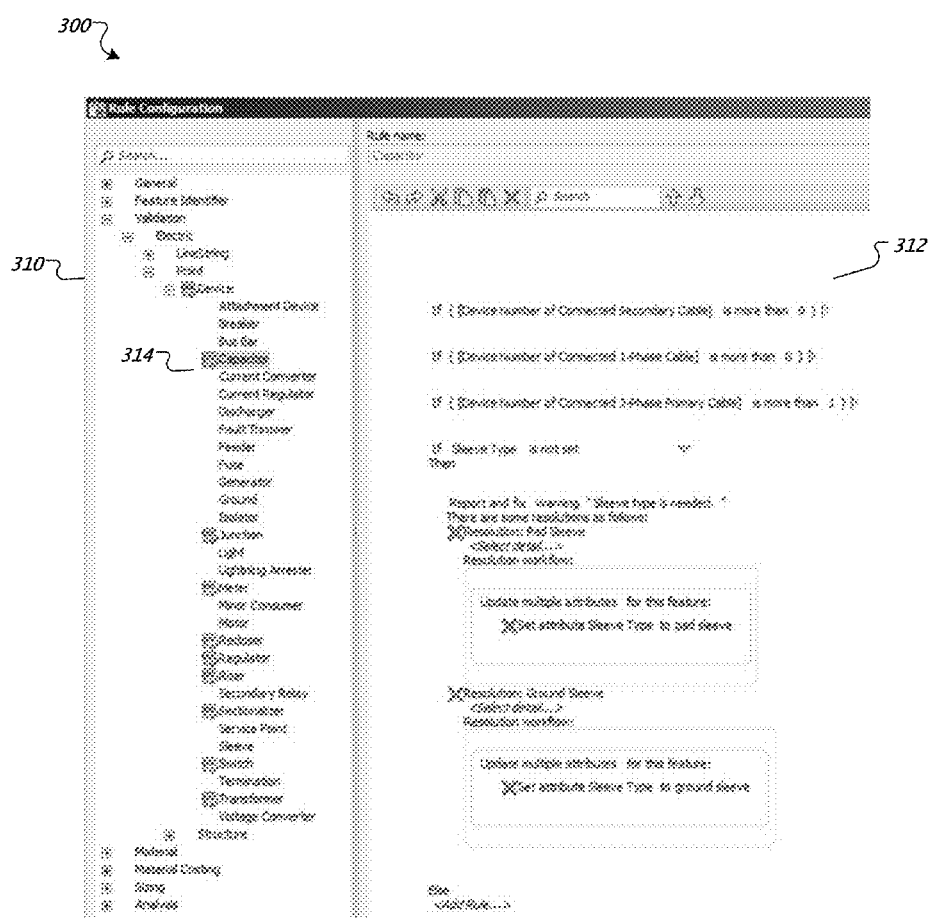
FIG. 3A is an example rule configuration interface describing a rule point for performing design validation of a capacitor.

FIG. 3A is an example graphical user interface 300 defining a rule point 312 for performing design validation of a capacitor. The rule configuration interface 300 includes a left-windowpane 310 listing rule points, which are arranged in a hierarchical order. A rule point for performing validation of a capacitor 314 is selected. In particular, the rule point for performing design validation of a capacitor 314 is arranged in a "Validation/Electric/Point/Device" hierarchy, where "Validation" is the top level category, where "Electric" is the second level category, where "Point" is the third level category, and where "Device" is the fourth level category. The right-windowpane 312 of the rule configuration interface 300 defines the rule point for validating a capacitor.

Figure 3B:
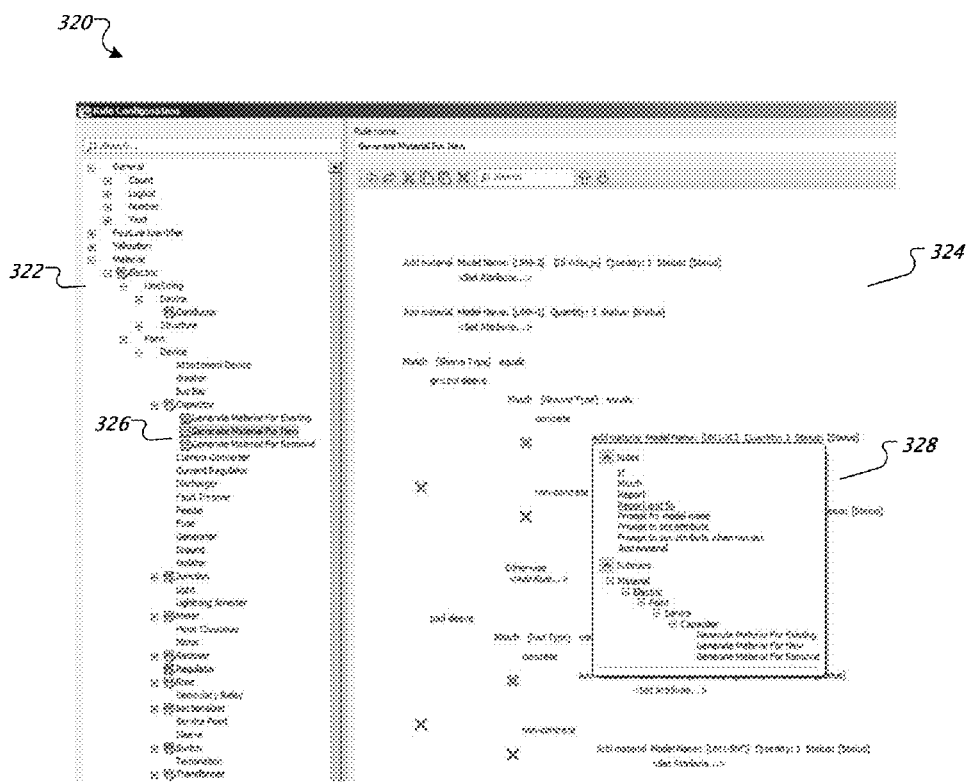
FIG. 3B is an example rule configuration interface describing a rule point for generating a material ordering listing.

FIG. 3B is an example rule configuration interface 320 describing a rule point for generating a material ordering listing. The rule configuration interface 320 includes a left-windowpane 322 listing rule points, which are arranged in a hierarchical order. A rule point for generating material for a new capacitor 326 is selected. In particular, the rule point for generating material for a new capacitor 326 is arranged in a "Material/Electric/Point/Device" hierarchy, where "Material" is the top level category, where "Electric" is the second level category, where "Point" is the third level category, and where "Device" is the fourth level category. The right-windowpane 324 of the graphical user interface 320 defines the rule point for generating material for a new capacitor. In particular, an interactive template 328 of a predefined condition in the rule point 326 is displayed. The interactive template 328 can be used to display one or more options for specifying programmable logic for the predefined condition.

Figure 4A:
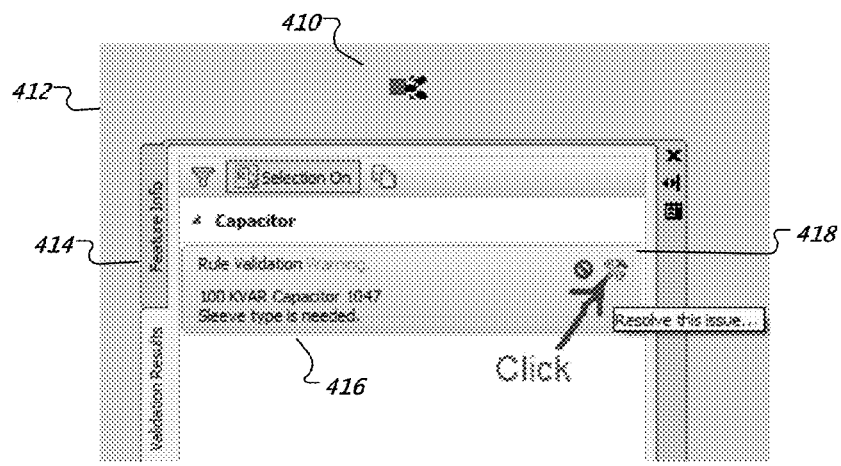
FIG. 4A-C illustrate example runtime sequences corresponding to a rule point for performing design validation of a capacitor.

FIG. 4A illustrates an example runtime sequence corresponding to a rule point for performing design validation of a capacitor 410. A capacitor 410 is created on a design interface 412 by a user. Results 414 for the capacitor element 410 are presented. In particular, the results 414 describe a rule validation error 416 indicating that a sleeve type is needed for the capacitor. A user can take corrective action in response to the rule validation error 416 by clicking a resolution button 418.

Figure 4B:
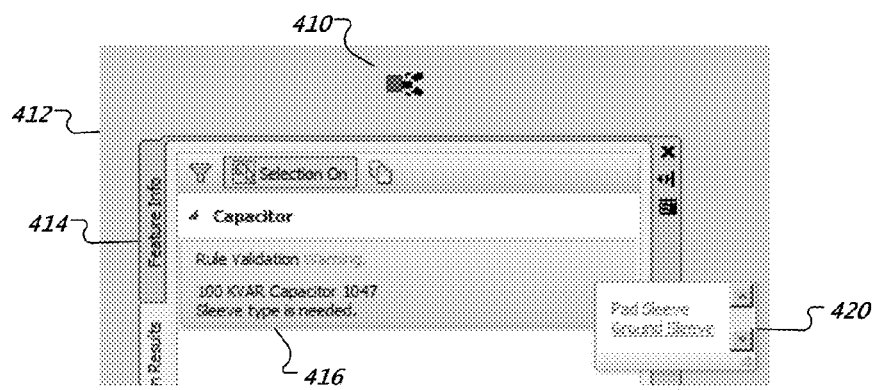

FIG. 4B illustrates an example runtime sequence corresponding to a rule point for performing design validation of a capacitor 410. In FIG. 4B, a user has taken corrective action in response to the rule validation error 416 by clicking a resolution button. A corrective action box 420 is presented in response to clicking the resolution button. A user can select an option included in the corrective action box 420 for correcting the rule validation error 416.

Figure 4C:
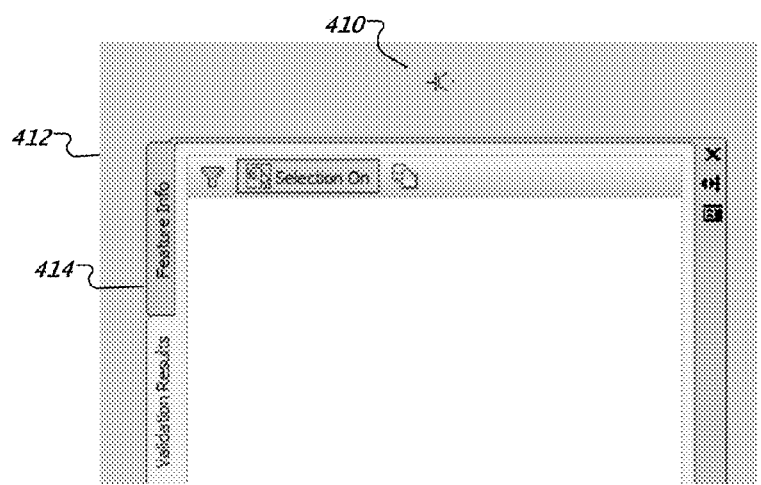

FIG. 4C illustrates an example runtime sequence corresponding to a rule point for performing design validation of a capacitor. In FIG. 4C, a user has taken corrective action in response to a rule validation error for a capacitor 410 created on a design interface 412. In particular, results 414 is shown as being empty, thereby indicating that no rule validation errors exist in connection with capacitor 410.

Figure 5A:
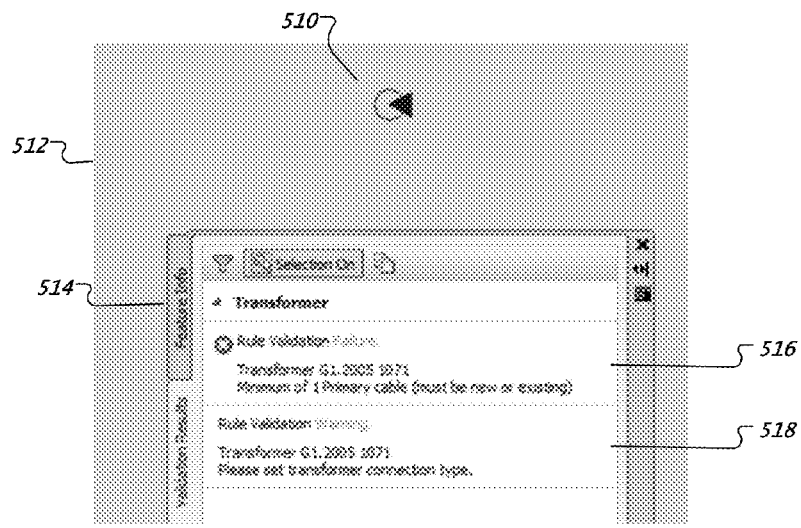
FIG. 5A-D illustrate example runtime sequences corresponding to a rule point for performing design validation of a transformer.

FIG. 5A illustrates an example runtime sequence corresponding to a rule point for performing design validation of a transformer 510. A transformer 510 is created on a design interface 512 by a user. Results 514 for the transformer 510 are presented. In particular, the error listing 514 describes a rule validation error 516 indicating that a minimum of one primary cable must be connected to the transformer 510. Results 514 also describe a second rule validation error 518 indicating that a transformer connection type is needed.

Figure 5B:
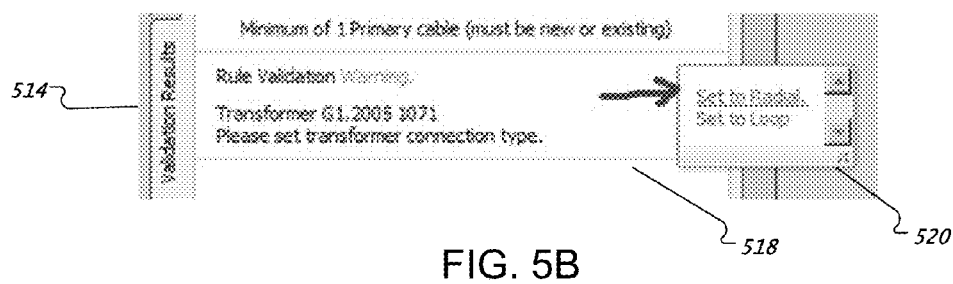

FIG. 5B illustrates an example runtime sequence corresponding to a rule point for performing design validation of a transformer 510. In FIG. 5B, a partial view of results 514 for the transformer 510 is shown. A user has taken corrective action in response to the second rule validation error 518 indicating that a transformer connection type is needed. In particular, a user has clicked a resolution button and, in response, a corrective action box 520 is presented. The correction action box 520 provides options for setting the transformer connection type to "radial" or "loop."

Figure 5C:
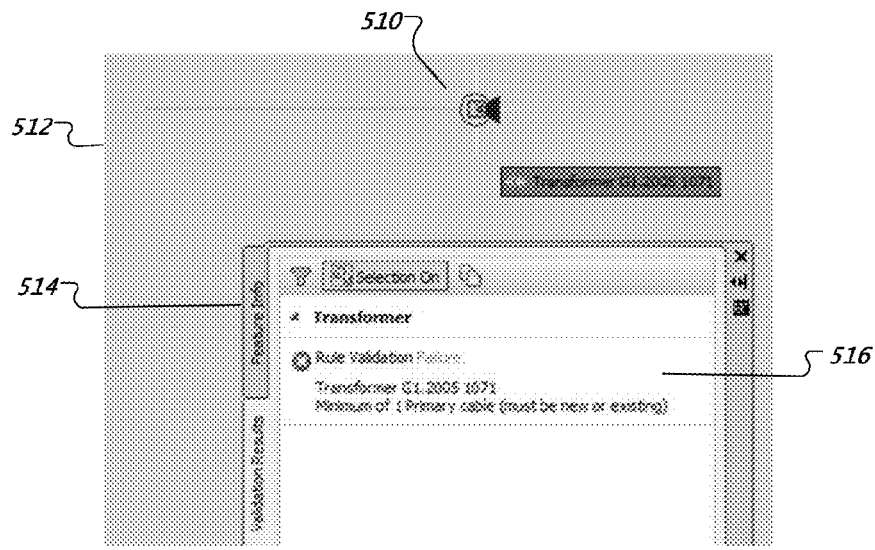

FIG. 5C illustrates an example runtime sequence corresponding to a rule point for performing design validation of a transformer 510. In FIG. 5C, updated results 514 for the transformer 510 are shown. In particular, the updated results 514 do not display the second rule validation error that was corrected by the user, as discussed in connection with FIG. 5B. The updated results 514 describe a rule validation error 516 indicating that a minimum of one primary cable must be connected to the transformer 510.

Figure 5D:
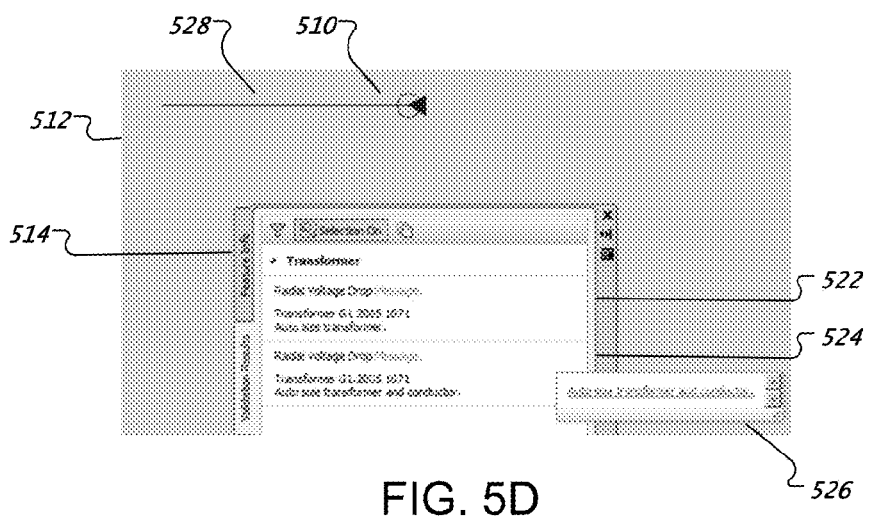

FIG. 5D illustrates an example runtime sequence corresponding to a rule point for performing design validation of a transformer 510. In FIG. 5D, a user has taken corrective action by connecting a primary cable 528 to the transformer 510 on a design interface 512. In response to the corrective action taken by the user, results 514 have been updated to include new rule validation errors 522 and 524 that were generated in response to connecting the primary cable 528 to the transformer 510. A correction action box 526 provides an option addressing rule validation error 524.

Figure 6:
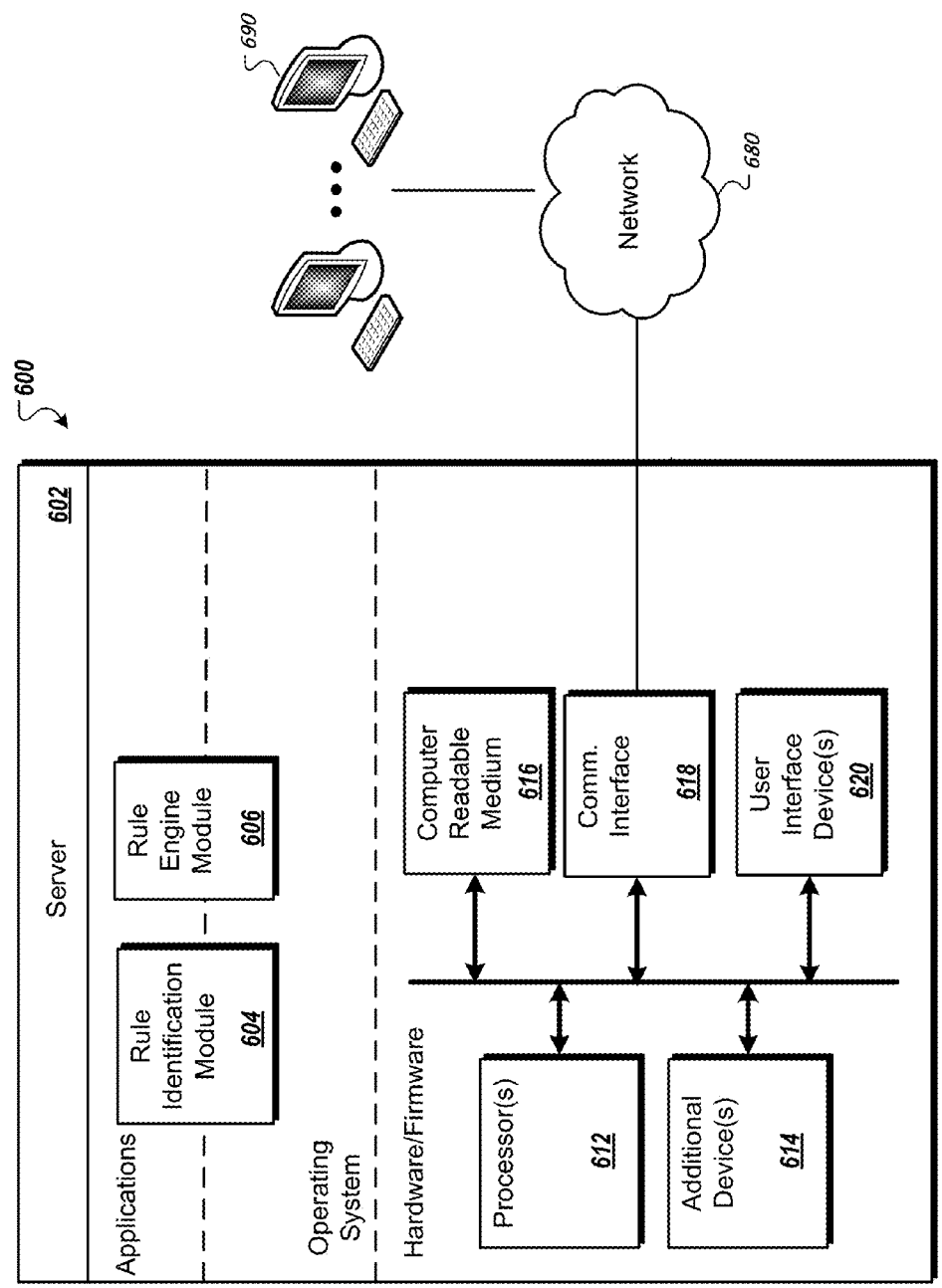
FIG. 6 is a schematic diagram of a generic computer system.

FIG. 6 is a schematic diagram of an example server 602. The server 602 is optionally connected to one or more user or client computers 690 through a network 680. The server 602 consists of one or more data processing apparatuses. While only one data processing apparatus is shown in FIG. 6, multiple data processing apparatus can be used. The server 602 includes various software modules, e.g. executable software programs or libraries, including one or more of: a rule identification module 604 and a rule engine module 606. Although several software modules are illustrated, there may be fewer or more software modules. Moreover, the software modules can be distributed on one or more data processing apparatus connected by one or more networks or other suitable communication mediums.

The server 602 also includes hardware or firmware devices including one or more processors 612, one or more additional devices 614, a computer readable medium 616, a communication interface 618, and one or more user interface devices 620. Each processor 612 is capable of processing instructions for execution within the server 602. In some implementations, the processor 612 is a single or multi-threaded processor. Each processor 612 is capable of processing instructions stored on the computer readable medium 616 or on a storage device such as one of the additional devices 614. The server 602 uses its communication interface 618 to communicate with one or more computers 690, for example, over a network 680. Examples of user interface devices 620 include a display, a camera, a speaker, a microphone, a tactile feedback device, a keyboard, and a mouse. The server 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the invention and all of the functional operations described in this specification can be implemented in digital electronic circuitry, or in computer software, firmware, or hardware, including the structures disclosed in this specification and their structural equivalents, or in combinations of one or more of them.

Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, the method comprising:
    providing a graphical user interface configured to present a view of a computer model of a network, wherein the model of the network includes a plurality of elements that represent physical objects in the network and wherein each of the elements is associated with one or more rule points;
    receiving user input selecting a rule point for an element presented in the view, wherein the rule point comprises a plurality of predefined conditions which are disabled by default;
    accepting user input specifying programming logic to be associated with first predefined condition of the plurality of predefined conditions of the selected rule point, the programming logic having been entered into a graphical user interface configured to present an interactive template of the first predefined condition;
    enabling the first predefined condition based on the accepting; and
    validating the model by simulating operation of the network wherein validating includes executing user-specified programming logic associated with predefined conditions of one or more of the elements including the user-specified programming logic associated with the first predefined condition.

2. The method of claim 1, wherein validating the model by simulating operation of network comprises generating an output associated with the elements.

3. The method of claim 2, wherein generating an output comprises:
    identifying an error associated with an element; and
    in response to the identification, providing a graphical user interface configured to present a solution for correcting the identified error.

4. The method of claim 2, wherein generating an output comprises:
identifying a warning associated with an element; and
in response to the identification, providing a graphical user interface configured to present a solution for correcting the identified warning.

5. The method of claim 2, wherein generating an output comprises:
identifying a suggestion associated with an element; and
in response to the identification, providing a graphical user interface configured to present a solution for implementing the suggestion.

6. The method of claim 2, wherein generating the output comprises generating a material ordering list.

7. The method of claim 2, wherein generating the output comprises generating a numeric value, wherein the numeric value is accessible by a second rule point.

8. The method of claim 2, wherein generating the output comprises generating a textual value, wherein the textual value is accessible by a second rule point.

9. The method of claim 1, wherein the selected rule point is associated with a rule group in a plurality of rule groups, wherein the rule groups are processed according to a specified ordering as part of validating the model, and wherein the selected rule point is processed when the associated rule group is processed.

10. The method of claim 9, wherein identification of an error in a rule group prevents processing of subsequent rule groups in the specified ordering.

11. The method of claim 1, wherein the selected rule point comprises one or more subrules that are shared with a least one other rule point, and wherein validating further comprises executing the one or more subrules.

12. A computer program product, encoded on a non-transitory computer-readable storage medium, operable to cause data processing apparatus to perform operations comprising:
providing a graphical user interface configured to present a view of a computer model of a network, wherein the model of the network includes a plurality of elements that represent physical objects in the network and wherein each of the elements is associated with one or more rule points;
receiving user input selecting a rule point for an element presented in the view, wherein the rule point comprises a plurality of predefined conditions which are disabled by default;
accepting user input specifying programming logic to be associated with a first predefined condition of the plurality of predefined conditions of the selected rule point, the programming logic having been entered into a graphical user interface configured to present an interactive template of the first predefined condition;
enabling the first predefined condition based on the accepting; and
validating the model by simulating operation of the network wherein validating includes executing user-specified programming logic associated with predefined conditions of one or more of the elements including the user-specified programming logic associated with the first predefined condition.

13. The program product of claim 12, wherein validating the model by simulating operation of network comprises generating an output associated with the elements.

14. The program product of claim 13, wherein generating an output comprises:
identifying an error associated with an element; and
in response to the identification, providing a graphical user interface configured to present a solution for correcting the identified error.

15. The program product of claim 13, wherein generating an output comprises:
identifying a warning associated with an element; and
in response to the identification, providing a graphical user interface configured to present a solution for correcting the identified warning.

16. The program product of claim 13, wherein generating an output comprises:
identifying a suggestion associated with an element; and
in response to the identification, providing a graphical user interface configured to present a solution for implementing the suggestion.

17. The program product of claim 13, wherein generating the output comprises generating a material ordering list.

18. The program product of claim 13, wherein generating the output comprises generating a numeric value, wherein the numeric value is accessible by a second rule point.

19. The program product of claim 13, wherein generating the output comprises generating a textual value, wherein the textual value is accessible by a second rule point.

20. The program product of claim 12, wherein the selected rule point is associated with a rule group in a plurality of rule groups, wherein the rule groups are processed according to a specified ordering as part of validating the model, and wherein the selected rule point is processed when the associated rule group is processed.

21. The program product of claim 20, wherein identification of an error in a rule group prevents processing of subsequent rule groups in the specified ordering.

22. The program product of claim 12, wherein the selected rule point comprises one or more subrules that are shared with a least one other rule point, and wherein validating further comprises executing the one or more subrules.

23. A system comprising:
a computer readable medium including a program product; and
one or more processors configured to execute the program product and perform operations comprising:
providing a graphical user interface configured to present a view of a computer model of a network, wherein the model of the network includes a plurality of elements that represent physical objects in the network and wherein each of the elements is associated with one or more rule points;
receiving user input selecting a rule point for an element presented in the view, wherein the rule point comprises a plurality of predefined conditions which are disabled by default;
accepting user input specifying programming logic to be associated with a first predefined condition of the plurality of predefined conditions of the selected rule point, the programming logic having been entered into a graphical user interface configured to present an interactive template of the first predefined condition;
enabling the first predefined condition based on the accepting; and
validating the model by simulating operation of the network wherein validating includes executing user-specified programming logic associated with predefined conditions of one or more of the elements including the user-specified programming logic associated with the first predefined condition.

24. The system of claim 23, wherein validating the model by simulating operation of network comprises generating an output associated with the elements.

25. The system of claim 24, wherein generating an output comprises:
   identifying an error associated with an element; and
   in response to the identification, providing a graphical user interface configured to present a solution for correcting the identified error.

26. The system of claim 24, wherein generating an output comprises:
   identifying a warning associated with an element; and
   in response to the identification, providing a graphical user interface configured to present a solution for correcting the identified warning.

27. The system of claim 24, wherein generating an output comprises:
   identifying a suggestion associated with an element; and
   in response to the identification, providing a graphical user interface configured to present a solution for implementing the suggestion.

28. The system of claim 24, wherein generating the output comprises generating a material ordering list.

29. The system of claim 24, wherein generating the output comprises generating a numeric value, wherein the numeric value is accessible by a second rule point.

30. The system of claim 24, wherein generating the output comprises generating a textual value, wherein the textual value is accessible by a second rule point.

31. The system of claim 23, wherein the selected rule point is associated with a rule group in a plurality of rule groups, wherein the rule groups are processed according to a specified ordering as part of validating the model, and wherein the selected rule point is processed when the associated rule group is processed.

32. The system of claim 31, wherein identification of an error in a rule group prevents processing of subsequent rule groups in the specified ordering.

33. The system of claim 23, wherein the selected rule point comprises one or more subrules that are shared with a least one other rule point, and wherein validating further comprises executing the one or more subrules.

* * * * *

UNITED STATES PATENT AND TRADEMARK OFFICE
CERTIFICATE OF CORRECTION

PATENT NO.        : 9,235,661 B2  
APPLICATION NO.   : 13/316221  
DATED             : January 12, 2016  
INVENTOR(S)       : Chris Cai et al.

Page 1 of 1

It is certified that error appears in the above-identified patent and that said Letters Patent is hereby corrected as shown below:

Claims

Column 10, line 46, in claim 1: before "first" please insert --a--.

Signed and Sealed this
Twelfth Day of April, 2016

Michelle K. Lee
*Director of the United States Patent and Trademark Office*